United States Patent [19]

Frechou et al.

[11] 4,344,359

[45] Aug. 17, 1982

[54] AUTOMATIC MACHINE FOR PEELING HARD-BOILED EGGS

[76] Inventors: Jerome Frechou, 17 Quai de l'Ile du Bac, 78700 Conflans Saint Honorine; Gilles Isambert, 65 Bis Rue de Marolles, 94470 Boissy Saint Leger, both of France

[21] Appl. No.: 147,605

[22] Filed: May 7, 1980

[30] Foreign Application Priority Data

May 15, 1979 [FR] France ............................ 79 12326

[51] Int. Cl.³ .......................... A23N 5/00; A47J 43/14
[52] U.S. Cl. ...................................... 99/580; 99/516; 99/536; 99/568; 99/582
[58] Field of Search .................. 99/516, 518, 534, 536, 99/568, 571, 580, 582

[56] References Cited

U.S. PATENT DOCUMENTS

| | | | |
|---|---|---|---|
| 1,997,881 | 4/1935 | Drexel | 99/568 |
| 2,575,608 | 11/1951 | Williams | 99/568 |
| 3,613,756 | 10/1971 | Snyder | 99/518 |

*Primary Examiner*—Philip R. Coe
*Assistant Examiner*—Timothy F. Simone
*Attorney, Agent, or Firm*—James & Franklin

[57] ABSTRACT

The invention relates to an automatic machine for peeling hard-boiled eggs.

The machine comprises a frame 3, a rotating stand comprising a plate 14 mounted at an end of a vertical shaft 7 rotating in a bearing 4, hard-boiled egg receiver cups 17 suspended around said plate 14, a chute 26 for conveying hard-boiled eggs, an upper carrier plate 26 for a return jack 21 and sleeves 27 distributed at the periphery of said plate and through which a series of vertically displaceable tools may slide, and a return plate 23 fixed at the end of the rod 22 of the jack 21 and adapted to control the displacement of the tools which are urged in the direction of the stand by compression springs.

Application in the automatic peeling of hard-boiled eggs on the industrial scale.

17 Claims, 7 Drawing Figures

AUTOMATIC MACHINE FOR PEELING HARD-BOILED EGGS

BACKGROUND OF THE INVENTION

The present invention relates to a method of peeling hard-boiled eggs and machines for carrying out this method.

The invention applies more particularly to the automatic peeling of hard-boiled eggs on an industrial scale such as notably in the hotelery industry (restaurants, canteens, etc.) or in organizations (hospitals, associations, etc.) where the consumption of hard-boiled eggs is very great.

Machines for peeling hard-boiled eggs are presently known using water under pressure for loosening the white of the egg from the shell and its membrane.

These machines give excellent results, but they operate manually and, when the white of the egg is driven out of the shell by the pressure of the water, it generally drags along the lower cap of said shell which is literally torn from the rest thereof. The peeling of the egg is therefore not complete and must be completed by a manual operation consisting of removing said cap which remains stuck to the white of the hard-boiled egg.

All of these manual operations obviously considerably reduce the output of the apparatus which perfectly suits family use or use in drinking establishments where the consumption of hard-boiled eggs is not very great; on the other hand, these devices have been shown to have an output clearly insufficient for use on the industrial scale when it is necessary to peel in a short time thousands of eggs, a task which customarily mobilizes a considerable staff.

Attempts at automating the operations of peeling hard-boiled eggs have already been made and various semi-automatic machines have been proposed, notably in U.S. Pat. No. 3,613,756. In order to improve output the machine disclosed in this American patent is designed so as to be able to simultaneously peel a great number of eggs arranged in baskets. It nonetheless has the drawback of necessitating a prior orientation of the eggs which must always be presented in the same direction. Further, this machine presents the same drawback as the manual machines, i.e., that the whites of the eggs which are ejected outside their shells carry with them a bit of the cap of said shell, which necessitates a supplementary peeling operation for eliminating the same.

The object of the present invention is therefore to propose a peeling method necessitating no preferred orientation of the eggs and thus permitting automating all the different operations and machines carrying out this method, said machines being entirely automatic, of simple design and compact and nevertheless permitting an elevated rate while necessitating no supplementary manual operation of peeling the egg whites extracted from their shells.

SUMMARY OF THE INVENTION

According to the invention, the method of peeling hard-boiled eggs essentially consists of injecting a fluid under pressure inside the shell between the membrane and the white, the injection of fluid being effected at both ends of the egg to be peeled.

The automatic machine for carrying out the above method comprises a carrier frame, plural hard-boiled egg receiver cups having an inlet orifice and a bottom provided with a constricted circular opening whose diameter is slightly less than the largest diameter of the eggs, and a source of compressed fluid, said machine further comprising:

a movable stand carrying receiver cups, means for driving the stand, a feeding station having a dispenser delivering a hard-boiled egg per cup which is presented, means adapted to break the shell at each end of the eggs, shattering means connected to the source of compressed fluid and serving to inject the fluid under pressure inside the shell between the membrane and the white of the egg, ejection means connected to the source of compressed fluid, said means being arranged as to be able to hermetically seal off the inlet orifice of the cups and put the interior thereof under pressure for driving the whites of the eggs out of their shells through the circular openings of the bottom of the cups, and a cleaning station provided with means adapted to drive the shell waste out of the cups.

According to the preferred form of construction of the invention, the stand comprises a receiver cup carrier plate and a support shaft coupled to said plate and rotatingly mounted in a fixed bearing.

According to a first mode of construction, the stand is discontinuously driven in rotation in successive portions of revolution, the driving means comprising a fixed jack, a lever one end of which is articulated at the rod of the jack and the other end of which is fixed for rotation with the support shaft, and a unidirectional drive coupling joint between the plate and the support shaft. The coupling joint between the plate and the support shaft may be a freewheel device or even a ratchet and pawl detenting system.

As a variant the means for driving the stand in rotation may comprise a step-by-step motor and gearing coupling the shaft of the motor to the support shaft which is fixed with the plate.

According to a first mode of construction, the control of the tools is assured by springs which independently urge each tool in the direction of the plate of the stand and by at least one jack for returning said tools to retracted position, the latter being connected to the rod of the jack by any connecting means whatever, which may be, for example, a return plate.

The means adapted to break the shell at each end of the eggs comprise two opposed hammers aligned in the continuation of each other along an axis which coincides with the axis of the receiver cups presented by the stand, said hammers being situated on each side of the cup and displaceable toward each other under the action of the means for controlling the tools.

Two opposed tubular shatterers are aligned in the continuation of each other along an axis which coincides with that of a receiver cup presented by the stand, said shatterers being situated on each side of the cup and displaceable toward each other under the action of said means for controlling the tools.

As for the ejection means they comprise a stopper which sealingly mates with the edge of the inlet orifice of the receiver cups. Said stopper is fixed to an open end of a tubular guide slidably mounted along an axis with which the axis of the cups presented coincide, while the other end of the guide is connected to the source of compressed fluid so as to be able to put the interior of the cup under pressure and thus flush the egg through the bottom of said cup. The cleaning station is equipped with a push rod adapted to break the shell remains and push the waste outside the cups.

According to a second mode of construction, the stand is driven in rotation continuously by a preferably electric motor and by a reducing gear train and the control of the tool is effected by ramps and cams along which they are displaced. The means adapted to break the shell comprise upper covers closing the inlet orifice of each cup and a lower hammer displaceable along a ramp in a manner to move successively toward each of the covers. Preferably, the covers are articulated on the stand in the vicinity of each cup and lifted by the push rods driven by said stand along the fixed ramps. The shattering means comprise a tubular shatterer surrounding the lower hammer and displaceable therewith, according to this second mode of construction, and the ejection means of each cup are essentially comprised by an orifice formed in each upper cover and connected to the source of compressed fluid by an injection valve with a push rod controlling the opening of said orifice and by a cam for controlling the push rods of said valves.

As for the cleaning of the cups it is assured by a jet of compressed fluid expelling the shell waste.

BRIEF DESCRIPTION OF THE DRAWING

The invention is now going to be described in greater detail by referring to particular modes of construction cited by way of non-limiting example and represented in the accompanying drawings in which.

DETAILED DESCRIPTION OF THE PREFERRED EMBODIMENTS

Figure 1:
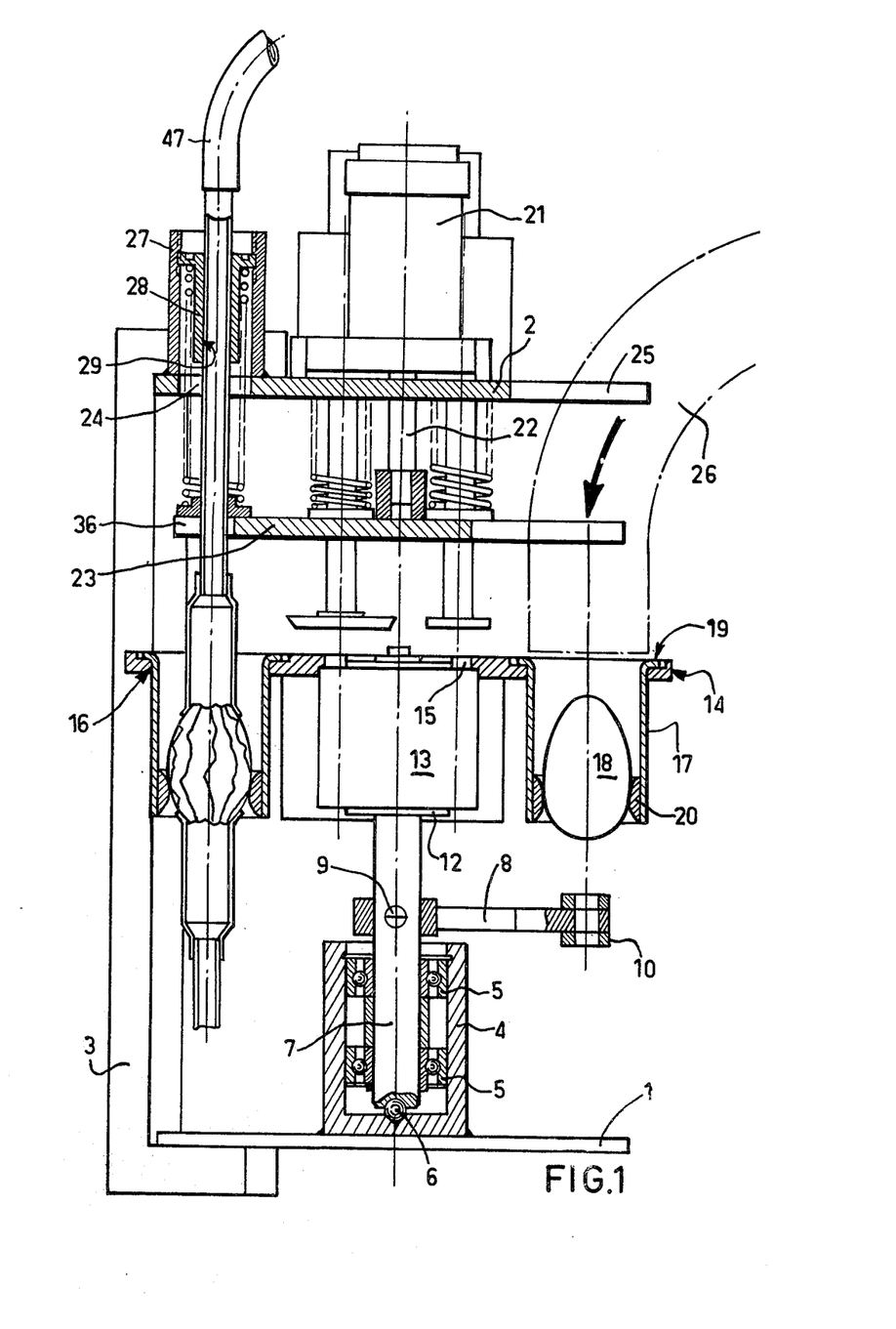
FIG. 1 represents an axial section of a machine according to a first mode of construction of the invention.

As represented in FIG. 1 the machine according to a first mode of construction comprises a carrier frame essentially constituted by a horizontal lower plate 1, an upper plate 2 and horizontal and lateral vertical uprights 3 connecting between themselves said plates and supporting the upper plate 2 plumb with the lower plate 1. At the center of the lower plate 1 is fixed a thrust bearing 4 in which are accommodated two superposed ball bearings 5 and a ball 6 resting on the bottom at the center thereof. A vertical shaft 7 is rotatingly mounted in said thrust bearing 4 so as to rest at an end on the ball 6. An end of a horizontal lever 8 is fixed for rotation with the vertical support shaft 7 by means of a pin 9, the other end of said lever 8 being articulated at the free end of the rod 10 of a jack 11 for driving in rotation (see FIG. 2) which jack 11 is fixed and which may be a hydraulic, electric or mechanical jack.

At the upper end of the vertical support shaft 7 is keyed the hub 12 of a freewheel, the rim 13 of which supports a horizontal circular plate 14 centered and fixed on said rim by means of screw 15. This plate 14 comprises, regularly distributed at its periphery, five circular openings 16 in which receiver cups 17 for hard-boiled eggs 18 are accommodated. The cups 17 comprise a tubular cylindrical body open at two ends and provided at its upper end with a retaining collar 19 serving to support the cup along the edge of the opening 16 in which it is accommodated, the lower end of said cup being provided with an annular bulge 20 determining in the bottom of the cup a constricted circular opening whose diameter is slightly less than the largest diameter of the hard-boiled eggs.

The plate 14, carrier of the five receiver cups 17, and the support shaft 7 to which it is coupled and which rotates in the fixed bearing constituted by the thrust bearing 4 form a pivoting stand for hard-boiled eggs whose rotational drive is assured in a discontinuous manner by the bellcrank lever 8 and by the fixed jack 11.

The upper plate 2, disposed plumb with the lower plate 1 and the rotating plate 14 of the stand, supports at its center a return jack 21 whose rod 22 slides in the continuation of the rotating shaft 7 of the stand and carries a horizontal return plate 23 screwed at its center to the free end of said rod.

The upper plate 2 comprises a series of regularly distributed cutouts at its periphery according to the directions forming between themselves 72° angles. Four of the cutouts 24 are circular and identical and their centers are situated at the same distance from the axis of the vertical support 7 as the vertical axes of the receiver shafts 17 supported by the plate 14 of the stand. The fifth cutout of the plate 2 is a notch 25 formed at its edge so as to allow to pass a supply chute 26 opening plumb with the pathway of the receiver cups 17 supported by the plate 14 of the stand, said chute delivering an egg per cup which presents itself thereunder.

In the continuation of the four circular openings 24 of the plate 2 are fixed to said plate 2 vertical tubular sleeves 27 internally threaded at their upper part and in which are screwed retaining and guiding sockets 28, said sockets comprising a central bore 29 in which the cylindrical shanks of the peeling tools described hereinbelow may slide.

At each cutout 24 cut in the upper plate 2 of the machine, corresponds a work station provided with particular tools, each automatically performing a peeling operation on the hard-boiled eggs delivered one by one by the chute 26 to each of the receiver cups 17 carried and driven in rotation by the plate 14 of the rotating stand.

Figure 2:
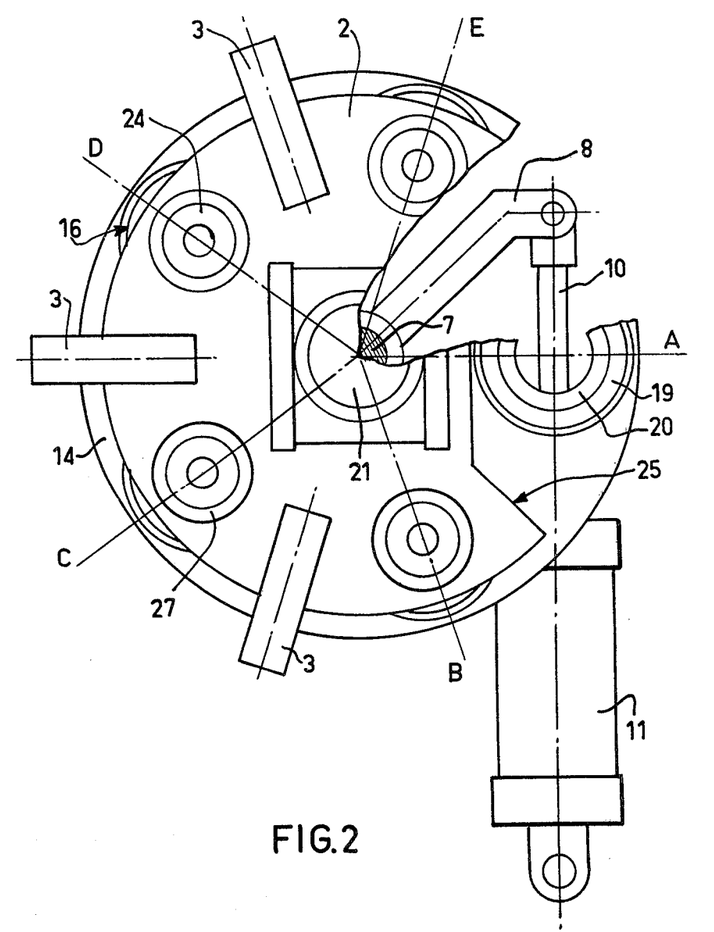
FIG. 2 represents a top view of the machine of FIG. 1 with a cutaway portion.

In FIG. 2 the different work stations are referenced A, B, C, D and E, the station E being the station for supplying hard-boiled eggs to the stand, said station comprising the egg dispenser which the aforesaid chute 26 constitutes. By rotating in the direction of rotation of the stand, which in FIG. 2 is the clockwise direction, each receiver cup 17 carried by the plate 14 is loaded with a hard-boiled egg 18 which has just been delivered by the chute 26 and it first encounters a percussion station B provided with two opposed hammers 30,31 vertically aligned in the continuation of each other on the vertical axis of one of the circular cutouts 24 of the upper plate 2. Said hammers 30 and 31 are identical and each constituted by one rod, respectively 32 and 33, provided at an end with a horizontal percussion plate, respectively 34,35, the two plates 34,35 being disposed facing each other on either side of the circular horizontal pathway travelled by the cups 17 and the hard-boiled eggs which they transport. The rod 33 of the upper hammer 31 (see, FIG. 3) traverses the return plate 23 through a notch 36 provided for this purpose and is continued vertically through a circular opening 24 of the upper plate 2 of the apparatus so as to slide in a sleeve 27 fixed on said plate. The rod 33 is provided with an abutment washer 37 fixed thereon and adapted to retain a compression spring passed on the rod 33 and on the upper socket 28 in which said rod slides, this spring 38 being retained at its two ends between, on the one hand, the upper guiding socket 28 and, on the other hand, the lower washer 37 fixed to the rod 33.

The following station encountered by a hard-boiled egg receiver cup in its rotation is a shattering station C which comprises two opposed tubular shatterers, respectively 39,40, vertically aligned in the continuation of each other along the vertical axis of the adjacent circular cutout 24 formed in the upper plate 2. Said shatterers 39,40 are capable of sliding vertically toward each other so as to move toward or away from the center of the hard-boiled egg receiver cups which are present at the shattering station. Each shatterer 39 or 40 is essentially composed of a tubular end piece, respectively 41,42, slightly flared at one end, and a sliding vertical tube, respectively 43,44, fixed at the other end of the respective end piece into which it opens. The upper tube 44 (FIG. 3) traverses the return plate 23 of the apparatus through one of the notches 36 thereof and may slide like rod 33 of the previously described hammer 31 in a guiding socket 28 also mounted in a sleeve 27 plumb with a circular opening 24 of the upper plate 2, this tube 44 being provided with an abutment washer 45 fitted and fixed, for example, by a weld, on said tube, while a compression spring 46 is passed on the tube 44 and held captive between said abutment washer 45 and the upper socket 28 in which the tube 44 slides. At the upper end of the tube 44 which extends above its sleeve 27 is branched a flexible hose 47 (see FIG. 1) which is connected to a source of compressed fluid not shown, said source, which may be either a pump adapted to convey water under pressure, notably into the shatterer, or even an air compressor adapted for the same function.

The following station of the machine (see FIGS. 2 and 3) is a so-called ejection station D fitted with an ejector, also supplied with compressed fluid by the aforesaid source and essentially composed of a horizontal disc 49 pierced at its center and a vertical tube 50 opening at the center of the disc 49 comprises a circular contour with frustoconical edges capable of sealingly mating with the edge of the inlet orifice of the receiver cups 17 containing hard-boiled eggs. As for the tube 50, it is continued vertically through a cutout 36 formed in the return plate 23 of the apparatus, and through an opening 24 of the upper plate 2, said tube 50 being slidingly mounted, as the tube 44 of the shatterer 40 and as the rod 33 of the hammer 31, in a socket 28 threaded inside a sleeve 27 fixed to the top of the upper plate 2 plomb with an opening 24 formed therein. This tube 50 is provided with an abutment washer 51 which is fixed thereto, and a compression spring 52 is passed on said tube and held captive between said abutment washer 51 and the upper guiding socket 28 in which the tube 50 slides. The upper end of said tube is also connected, as that of the tube 44 of the shatterer 40 to the source of compressed fluid through the intermediary of a flexible hose not shown.

Finally, the fourth and last work station E of the machine is a cleaning station comprising a push rod 53 resembling the aforesaid hammers 31 and 32 and comprising a vertical rod 54 provided at its free lower end with a horizontal circular thrust plate 55 whose diameter neighbors on but is slightly less than the diameter of the constricted outlet orifice formed at the bottom of the receiver cups 17 by the annular bulge 20 provided therein. In the same manner as the rods 33 and the tubes 44 and 50 of the other peeling tubes described previously, the rod 54 upwardly traverses the plate 23 through a notch 36 and may slide inside a socket 38 threaded in a sleeve 27 fixed on the top of the upper plate plumb with a circular cutout 24 thereof. The rod 54 carries an abutment washer 56 which is fixed thereto and a compression spring 57 is passed on said rod and held captive at its end between the washer 56 and the guiding socket 28 in which the rod 54 may slide.

It will be appreciated that the lower tools (that is, hammer 30 and shatterer 39) may be controlled in the same manner as the upper tools (that is, hammer 31 and shatterer 40). In other words, the means for controlling the operation of the lower tools may be the same as the means for controlling the operation of the upper tools. Thus, a lower compression spring similar to upper compression spring 38 is associated with the lower hammer 30 and a lower compression spring similar to upper compression spring 46 is associated with the lower shatterer 39, both of these lower compression springs acting to force the lower tools upwardly in the direction of the plate 14. Further, the lower control means may include a lower return jack similar to upper return jack 21 and a lower connecting means such as a return plate similar to upper return plate 23 for forcing compression of the lower control means springs and their retreat from the plate 14. As the lower control means comprising springs, return jack and return plate are identical to the upper control means, they have for the purpose of clarity of illustration been omitted from the drawing.

It will be noted that all the work tools described previously, i.e., the hammers, the shatterer, the ejector and the push rod, are all permanently urged by their associated compression springs in the direction of the plate 14 of the stand, the holding of said tools in the retracted position being obtained by the return plate 23 pulled upwardly by the rod 22 of the upper control jack 21 which is carried by the upper plate 2 and the lower return plate pulled downwardly by the rod of the lower control jack. The lowering of the return plate 23 and the raising of the lower return plate permit the simultaneous displacement of all the tools in the direction of the receiver cups 17 situated plumb thereof to be obtained.

Figure 3:
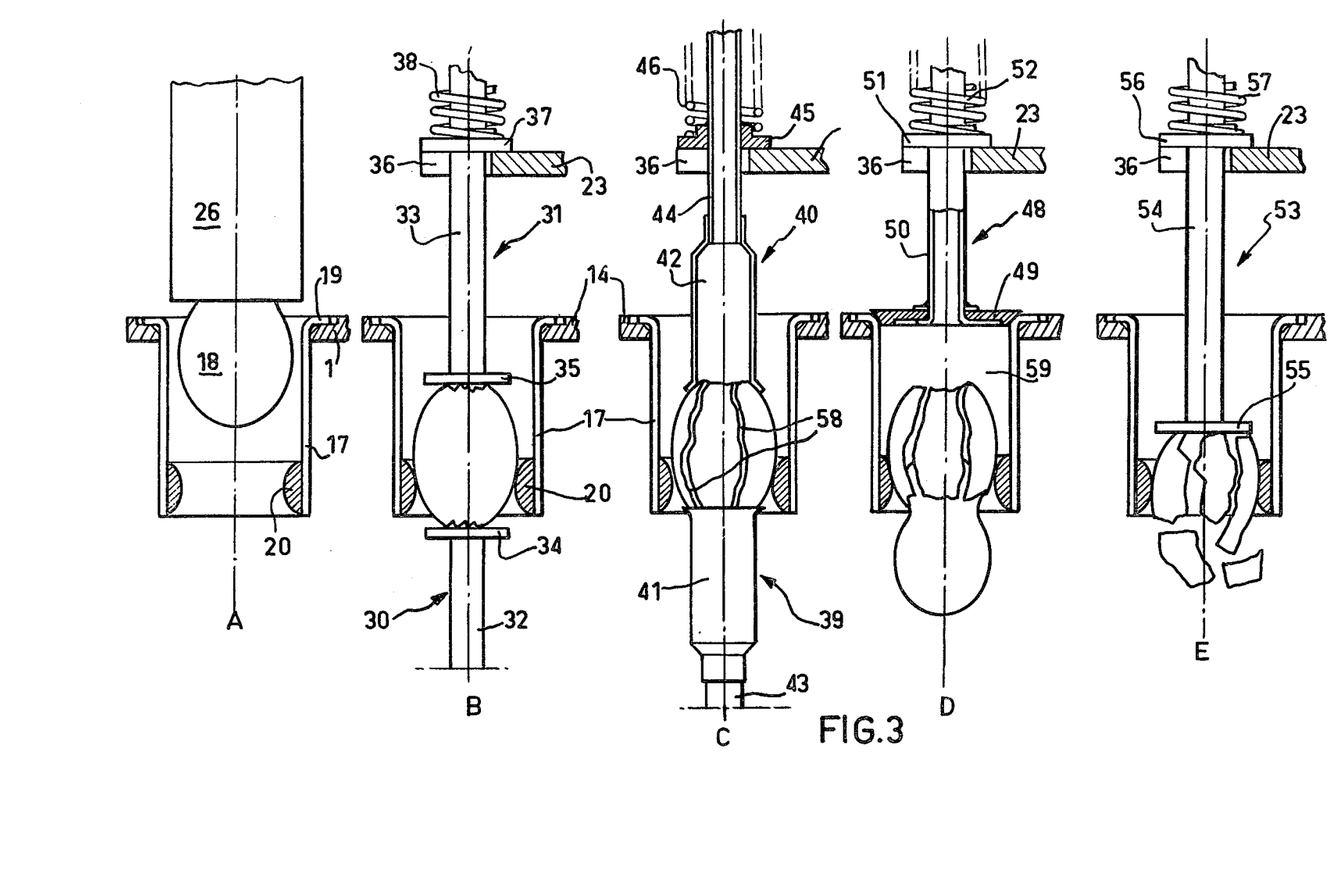
FIG. 3 illustrates the different operations of treating the hard-boiled eggs at the different work stations of the machine represented in FIGS. 1 and 2.
Figure 4:
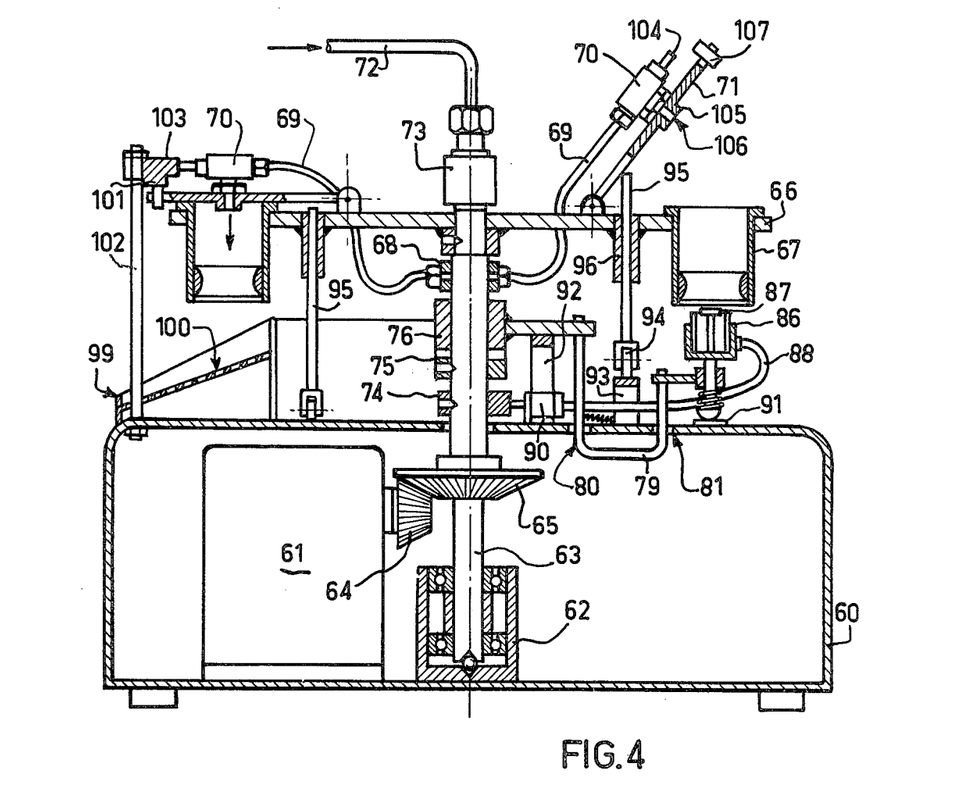
FIG. 4 represents an axial section of a machine according to a second mode of construction of the invention.

The automatic machine for peeling the hard-boiled eggs according to the invention such as described previously operates in the following manner (see FIG. 3):

The plate 14 of the stand being immobilized such that a receiver cup is disposed plumb with each of the work stations of the machine, and notably under the notch of the dispensing chute 26, a hard-boiled egg 18 to be peeled is conveyed via said chute into a cup 17 disposed thereunder. The egg 18 falls to the bottom of said cup and is retained in upright position by the annular bulge 20 which constricts the outlet orifice of the cup (FIG. 3A).

The plate 14 of the stand with the cups it supports are then driven in rotation in the clockwise direction through an angle of 72° by the bellcrank lever 8 and the rod 10 of the jack 11 which retracts. The cup 17 containing the hard-boiled egg to be peeled 18 is thus brought in plumb with the percussion station B between the two hammers 30 and 31 of said station. The rod 22 of the jack 21 is then extended, which lowers the return plate 23 and permits the coming together of the two hammers 30 and 31 which are urged toward each other by their respective compression springs, the percussion plates 34 and 35 of said hammers striking and breaking the shell of the hard-boiled egg at its opposed upper and lower ends. The rod 22 of the return jack 21 is then retracted which causes the lifting of the plate 23, the compression of the springs urging the tools, and the displacement thereof set back in relation to the receiver cups containing the hard-boiled eggs which may then rotate a notch with the plate 14 of the stand under the impulse of the jack 11, which causes a pivoting of 72° of the receiver cups in the clockwise direction such that the hard-boiled egg 18 whose two, upper and lower, ends have just been broken by the hammers 30 and 31 of station B, is brought to station C in coincidence with the axis of the tubular shatterers 39 and 40. The rod 22 of the return jack 21 is again extended, thus causing the lowering of the plate 23 and the coming together of the shatterers 39 and 40 whose flared ends of their tubular end pieces 41 and 42 sealingly bear against the two broken ends of the shell of the hard-boiled egg (see FIG. 3C). When the hard-boiled egg 18 to be peeled is thus engaged between the two shatterers 39 and 40, the compressed fluid, which may be water or air, is conveyed by the source of fluid through the flexible hose 47 and the tubes 43,44 into the end pieces 41 and 42. Under the effect of the pressure, the fluid penetrates between the white of the egg and the membrane which is stuck to the shell and causes the cracking thereof and its shattering along longitudinal cracks 58 (FIG. 3C).

The admission of compressed fluid is then interrupted and the shatterers 39,40 are retracted by the lifting of the plate 23 pulled by the rod 22 of the return jack 21, which frees the passage of the cups 17 which are again driven in rotation through an angle of 72° by the driving jack 11 and the bellcrank lever 8 keyed to the shaft 7 of the stand, this bringing the longitudinally cracked egg to the ejection station D where the lowering of the plate 23 causes the fluid-tight closing of the inlet orifice of the cup 17 by the circular stopper 49 of the ejector 48. Compressed fluid, air or water, is then conveyed by the source through the flexible hoses 47 and the tube 50 to the ejector, which pressurizes the internal cavity 59 of the cup, said pressure forcing the white of the egg out of its cracked shell and out of the cup itself through its constricted outlet opening formed at the bottom of said cup; the ejection being effected without difficulty owing to the fact that the white of the egg no longer adheres to the membrane, which remains stuck to the shell and that this white which is deformable elastically stretches to pass through said constricted opening. There is again an interruption of the admission of the compressed fluid, then lifting of the plate 23 by the return jack 21 with the withdrawal of the ejector 48 out of the pathway of the cups 17, which cups again effect a rotation of 72° still in the clockwise direction such that the cup 17 which contains nothing else than the cracked shell of the egg is disposed plumb with the cleaning station E under the push rod 53. The extension of the rod 22 of the jack 21 followed by the lowering of the plate 23 causes the descent of the push rod 53 inside the cup 17 and the driving of the shell waste by the plate 55 of the push rod out of the cup 17 through the constricted opening of the bottom of said cup (cf. FIG. 3E).

The lifting of the plate 23 causes the withdrawal of the push rod 53 out of the pathway of the cups 17 and a new rotation thereof through 72° such that the cup which has just been cleaned is again situated under the mouth of the supply chute 26 The dispenser delivers a new hard-boiled egg into the empty cup and the cycle commences again.

Of course, all the tools operate at the same time, so that each lowering of the plate 23 of the automatic machine according to the invention simultaneously accomplishes the simultaneous percussion of the two opposed ends of a first hard-boiled egg, the longitudinal cracking of the shell of a second hard-boiled egg situated at the adjacent position, the ejection of the white out of the cracked shell of a third hard-boiled egg and the driving of the waste of the empty shell of a fourth egg out of its receiver cup.

The output of the machine is a function of the speed of rotation of the plate of the stand and the rate of operation of the tools of the apparatus which are variable at will by acting on the control of the driving jack 11 and the return jack 21 whose rates are mutually controlled, such that after each retraction of the rod 10 of the jack 11 for driving in rotation there follows an extension of the rod 22 of the return jack and vice versa.

The ejected egg white at the ejection station D falls onto a grill or into an exit chute while the compressed fluid, if it is a liquid, is collected under the machine and recycled to the source. Likewise, the shell waste driven to the cleaning station E is collected in a bin situated under the machine and discharged.

The driving jack 11 may obviously be replaced by any other discontinuous driving means whatsoever such as for example a step-by-step electric motor whose shaft carries a pinion meshing with a gear fixed on the support shaft 7 of the plate 14 of the stand.

Likewise, the vertical movement of the return plate 23 may be assured other than by a return jack, and notably by a cam rotatingly mounted at the end of a shaft of an electric motor continuous rotating at low speed, said cam serving to drive downwardly the return plate 23 at regular intervals in synchronization with the rotational driving of the stand.

In the example described previously, the different plates, and notably the plate of the stand, are provided horizontal, but of course said plates may occupy an oblique intermediate position or even be disposed vertically and rotate about horizontal axes, which obviously changes nothing of the principle of the invention.

FIGS. 4 to 7 concern a second mode of construction of machine for peeling the eggs employing the method according to the invention.

This machine comprises a housing 60 (FIG. 4) inside which are housed an electric drive motor 61 and a thrust bearing 62 vertically supporting a shaft 63 which traverses the upper wall of the housing, the rotational driving of said shaft being effected by the intermediary of reduction gear train of a conical gears 64 and 65 in permanent mesh. At the upper part of the shaft 63 is fixed a horizontal circular plate 66 pierced by four circular orifices regularly distributed at its periphery in which are accommodated two receiver cups 67 similar to the cups 17 previously described. The upper end of the shaft 63 is pierced longitudinally and the bore thus constituted opens through four radial conduits (FIG. 5) into a distributor ring 68 clamped around the shaft. In this ring are screwed endpieces of four supply conduits 69 whose other ends are connected to four valves 70 with push rods mounted on four covers 71 articulated at one side on the plate and adapted to close off the inlet orifices of the four receiver cups 67. A conduit 72 (FIG. 4) is connected by the intermediary of a rotating joint 73 at the inlet of the bore of the shaft 63 and the other end of said conduit is connected to a source of fluid under pressure such as water under pressure or compressed air not represented.

On the portion of shaft 63 included between the upper wall of the housing 60 and the fluid distribution ring 68 (FIGS. 4 and 5), are respectively passed on from bottom to top a cam 74 and a driving nut 75 with claws, both keyed to the shaft, and a sliding sleeve 76 freely rotatingly mounted. The nut 75 and the sleeve 76 are represented in greater detail in FIG. 7, the nut 75 which is fixed for rotation on the shaft 63 comprising four drive claws 77 capable of meshing one after another with a tooth 78 protruding from the lower part of the sleeve 76 freely mounted on the shaft 63, both for rotation and axially. The nut 75 and the sleeve 76 constitute escapement drive means.

Figure 5:
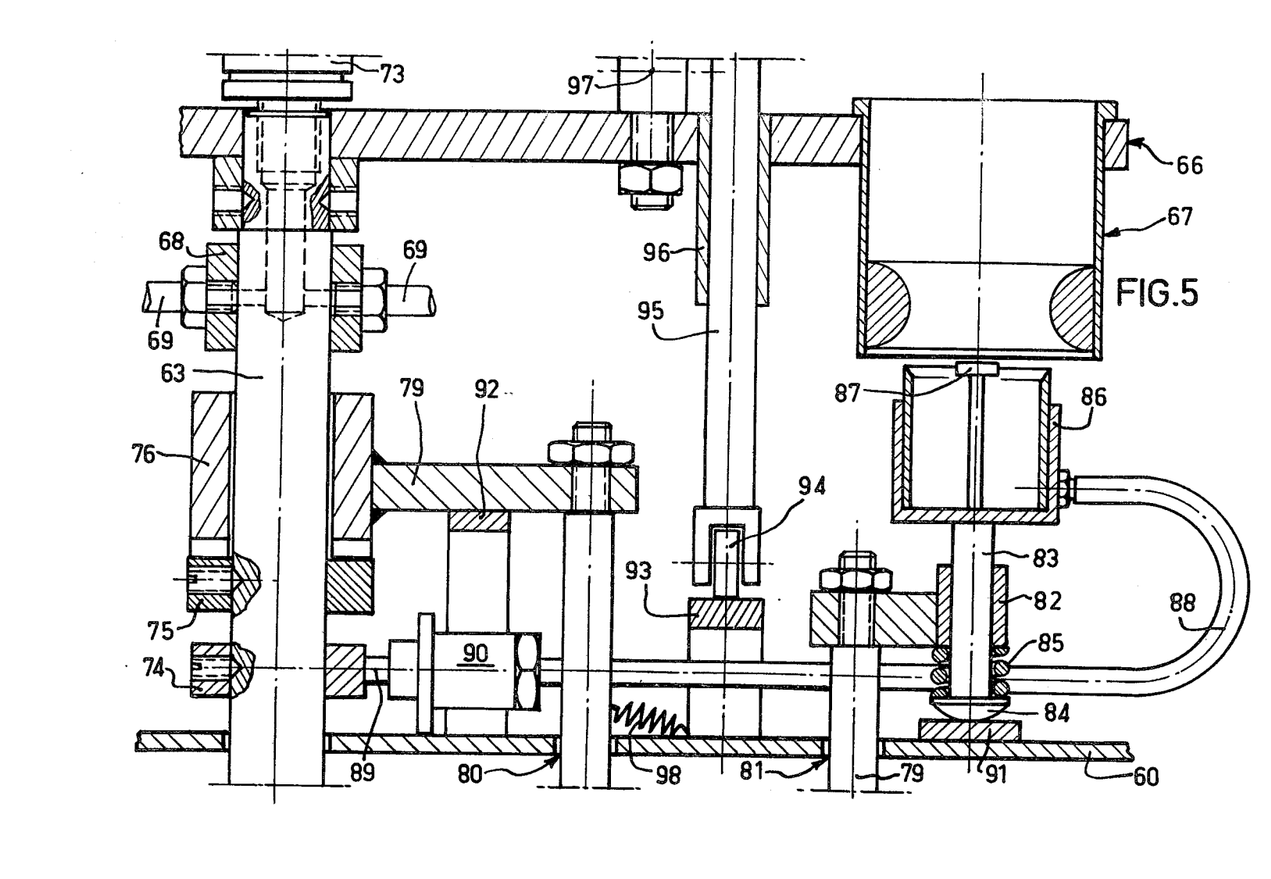
FIG. 5 represents an enlarged view of the upper right-hand part of the machine of FIG. 4.

To the sleeve 76 is welded an arm 79 (FIGS. 4,5) of crank shape whose vertical branches of the U part traverse the upper wall of the housing 60 in the concentric circular arc slots 80 and 81 centered on the axis of the shaft 63 (see FIG. 6), said circular slots extending over about a quarter of a circumference. At the free end of the arm 79 is welded a sleeve 82 (FIG. 5) in which is slidingly mounted a vertical rod 83 provided at its lower part with a hemispherical shoe 84 and urged downwardly by a return spring 85 passed on said rod between the shoe 84 and the sleeve 82, the upper part of this rod being fixed to the bottom of an upwardly open cylindrical shatterer 86 and provided at its center with an axial hammer 87 adapted to break the shells of eggs to be peeled. The shatterer 86 is connected by a flexible hose 88 to a source of fluid under pressure (air or water) not represented, the fluid supply being controlled by the cam 74 acting on the push rod 89 of a valve 90 interposed in the circuit (FIG. 5). The shatterer 86 with its hammer 87 and its sliding rod 83 are movable upwardly in the direction of the receiver cups 67 under the thrust of the shoe 84 progressing along an inclined ramp 91 carried by the upper wall of the housing 60, said ramp being a circular arc and centered on the axis of rotation of the arm 79. Two other circular arc ramps 92 and 93 (FIG. 6) centered on the axis of the shaft 63 are carried by the upper wall of the housing 60. The first ramp 92 is disposed under the horizontal part of the arm 79 which is welded to the sleeve 76 and in the end of stroke zone of said arm, the upper surface of said ramp rising to such a level that the tooth 78 of the sleeve 76 is disengaged from the claws 77 of the drive nut 75 (FIG. 5).

The second ramp 93 extends along a semicircle and serves as a four roller 94 race rotationally mounted at the lower part of the four vertical push rods 95 each associated with a cover 71 of a receiver cup 67, said push rods being slidably mounted in vertical sleeves 96 traversing the stand plate 66 and fixed thereon between the receiver cups 67 and the articulations 97 of their covers 71. The length of the push rods is chosen such that they do not reach the covers 71, when their rollers 94 do not roll on the ramp 93 and they lift them when the rollers travel along said ramp as represented respectively in left-hand and right-hand parts of FIG. 4. A traction spring 98 connects a vertical branch of arm 79 to the upper wall of the housing 60 (FIG. 5), this spring serving to return the arm 79 rearward when the driving tooth 78 of the sleeve 76 is not in mesh with a claw 77 of the nut 75.

The machine further comprises a circular arc bin 99 fixed to the hood 60 under the circular pathway of the receiver cups 67, this bin serving to collect the shell waste and water forced through the cups. The bin 99 comprises classic draining means not represented and an inclined grill 100 serving as a filter.

The ramp 101 supports a curvilinear cam 103 for controlling the injection of compressed fluid into the cups 67, said cam serving to drive the push rods 104 assuring the opening of the valves 70 mounted on the covers 71. Each cover 71 comprises a central hammer 105 traversed at its middle by a fluid injection conduit 106 supplied through a valve 70 and a flexible hose 69 (FIG. 4) and, on the opposed side of its articulation 97 on the plate 66, each cover is provided with a peripheral roller 107 which may engage under the ramp 101 for locking the covers 71 in a closed position.

Figure 6:
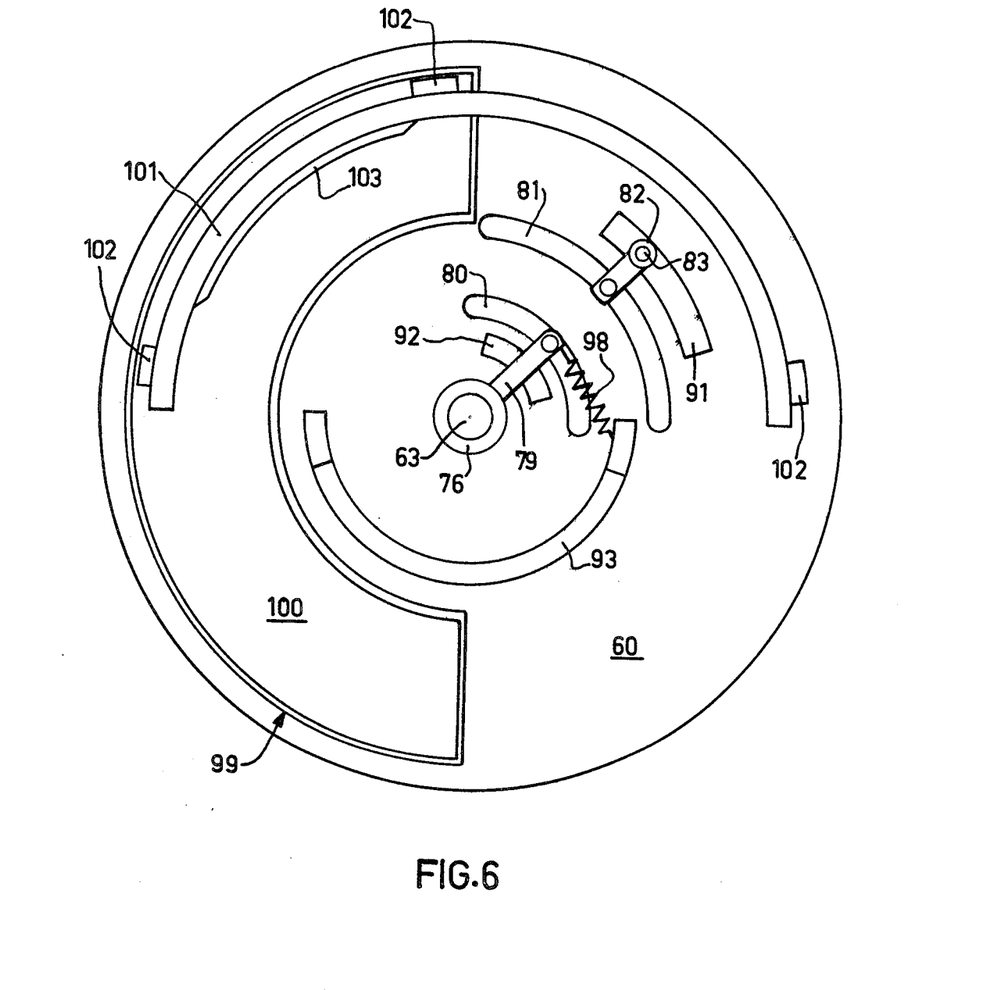
FIG. 6 represents a top view of the machine of FIG. 4 with the stand removed.
Figure 7:
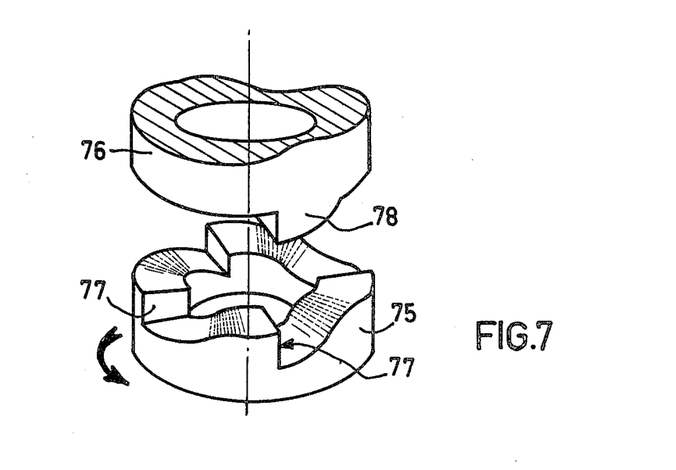
FIG. 7 represents an enlarged view in perspective of a drive nut.

The reciprocal arrangement of the different ramps, cams and slots is represented in the top view of FIG. 6. In this figure it is seen that the locking ramp 101 extends to the periphery of the stand and of the hood 60 over an entire half circumference. The circular bin 99 also extends over a half circumference but the latter is shifted 90° in the counterclockwise direction in relation to the locking ramp 101.

The ramp 93, which serves as a raceway for rollers 94 and controls the opening of the covers 71, also extends over a semicircle shifted 90° in the anticlockwise direction in relation to the circular bin 99; in other words the opening ramp 93 obviously extends over a half circumference opposite to the locking ramp 101.

As for the two ramps 91 and 92 acting respectively on the shoe 84 of the shatterer and on the support arm 79 as well as the two slots 80 and 81 for said arm through the hood 60, they extend concentrically in the sector delimited peripherally by the first half of the locking ramp 101 considered in the anticlockwise direction, the injection controlling cam 103 being supported by the second half on the locking ramp and extending over about two thirds of said half.

The machine according to this second mode of construction operates in the following manner.

The motor reduction gear 61,64,65 rotationally drives at constant speed in the counterclockwise direction and according to continuous movement, at the same time, the shaft 63, the cam 74, the nut 75, the ring 68 and the stand plate 66 which are fixed between themselves. In its rotation the plate 66 drives at the same time the receiver cups 67 and their covers 71 equipped with valves 70 and the push rods 95. As rollers 94 roll alternately on the hood 60 and the ramp 93, the associated push rod 95 is raised and lifts the corresponding cover 71, thus opening the inlet orifice of the associated receiver cup 67 which may receive a hard-boiled egg to be peeled brought automatically by a supply chute not represented in FIGS. 4 to 6 but similar to the chute 26 in FIG. 1. The hard-boiled egg positions itself vertically in the receiver cup where it is retained by the lower constriction of said cup, the lower end of the egg extending below the same. In order to not risk shearing the egg at the time of introduction into the cup owing to the fact that the plate 66 does not interrupt its rotational movement, a follower chute may be provided which accompanies the cup to be supplied for a few moments.

When the roller 94 arrives at the end of the ramp 93 and descends the same, it causes the retraction of its push rod 95 and the closing of the associated cover 71 whose hammer 105 comes to rest on the upper end of the egg contained in the cup and whose locking roller 107 is engaged at the entry of the locking ramp 101 which initiates the crushing of said end of the shell. Simultaneously, the tooth 78 of the sliding sleeve 76 comes into mesh with one of the four claws 77 of the drive nut 75 causing a rotation of about 70° of the crank-arm 79 and its associated shatterer 86 whose shoe 84 climbs up along the ramp 91. As the rotation of the stand continues and as the shoe 84 progresses along the ramp 91, the hammer 87 of the shatterer comes to crush the lower end of the shell that the shatterer caps.

When the egg is then wedged between the upper hammer 105 of the cover and the lower hammer 87 and capped at its base by the shatterer 86, the rotating cam 74 which comprises as many bosses as there are cups on the stand (four in the example considered), drives the push rod 89 of the fixed valve 90, which opens the latter and causes the admission of fluid under pressure such as water into the shatterer 86. This water under pressure penetrates into the shell through its crushed lower end and infiltrates between the white of the egg and the skin of the shell, making the latter shatter.

In its anti-clockwise progression, the shoe 84 then descends the ramp 91 which frees the base of the egg owing to the downward retraction of the hammer 87 and the shatterer 86. The horizontal part of the arm 79 welded to the sleeve 76 continues to proceed along the ramp 92 and reaches the top thereof; the sleeve is then lifted to the maximum which disengages its tooth 78 from the engagement of the corresponding claw 77 of the driving nut 75 and permits the return of the arm 79 rearward by the return spring 98 while the cup 67 containing the egg penetrates above the bin 99 and while the end of the push rod 104 of the valve 70 fixed to the cover 71 initiates its contact with the injection cam 103. As the cup 67 continues to rotate, the push rod 104 is driven by the cam 103 and causes the opening of the valve 70 and the injection of the water under pressure through the orifice 106 of the cover. This latter being firmly locked by its roller 107 and the ramp 101, the pressure in the cup rises and the hard-boiled egg is expelled through the constriction of the bottom of the cup and falls onto the grid 100 of the bin 99 which collects the injected water. The empty cup continues its rotation above the circular bin 99 while the roller 107 of the cover 71 leaves under the locking ramp 101 and while the roller 94 of the corresponding push rod 95 mounts the opening ramp 93 which lifts the covers. The empty cup 67 is then cleaned by a jet of fluid under pressure, such as compressed water or air, directed either above or below, the cleaning jet expelling the last of the shell wastes still remaining in the cup, which is again presented at the outlet of the supply chute for receiving a new egg to be peeled and the cycle commences again. A continuous circulation of water may be provided in the bin 99 for permanently evacuating the shell waste and an automatic system of evacuating the peeled eggs may also be associated with the machine; further, the water collected in the bin 99 may optionally be recycled after filtering.

The machine according to the invention may entirely automatically peel a very great quantity of hard-boiled eggs per hour and without any additional manual intervention being necessary owing to the fact that the peeled egg ejected from the cup to the ejection station does not entrain with it the lower cap of the broken shell.

Of course the scope of the invention is not limited to the single mode of construction described above but it also covers all the variants which differ only in details.

We claim:

1. An automatic machine for peeling hard-boiled eggs comprising
    (A) a carrier frame;
    (B) a plurality of hard-boiled egg receiver cups, each of said cups having an inlet orifice and a bottom defining a constricted circular opening whose diameter is slightly less than that of the largest diameter egg;
    (C) a source of compressed fluid;
    (D) a movable stand carrying said cups;
    (E) drive means for driving said stand;
    (F) a feeding station provided with dispenser means for delivering a hard-boiled egg to one of said cups presented thereto;
    (G) break means for breaking the shell of the egg at each end thereof;
    (H) shattering means operatively connected to said source of compressed fluid for injecting said compressed fluid under pressure inside the shell between the membrane and the white of the egg to shatter the shell;
    (I) ejection means operatively connected to said source of compressed fluid for hermetically sealing off the inlet orifice of said cup and putting the interior thereof under sufficient pressure to drive the white of the egg out of its shattered shell through said constricted circular opening of said cup, and
    (J) a cleaning station provided with cleaner means for driving the shattered shell out of said cup.

2. The machine of claim 1 wherein said stand comprises a fixed bearing, a carrier plate for supporting said cups, and a support shaft coupled to said plate and rotatably mounted in said bearing.

3. The machine of claim 2 wherein said drive means for driving said stand comprise a step-by-step electric motor and gearing coupling the shaft of said motor to said support shaft.

4. The machine of claim 2 wherein said drive means for driving said stand comprises a direct current electric motor and a reduction gear train coupling the shaft of said motor and said support shaft.

5. The machine of claim 2 wherein said drive means for driving said stand comprises a fixed jack having a movable rod, a lever having one end thereof articulated to said jack and the other end thereof fixed for rotation with said support shaft, and a unidirectional drive coupling joint operatively coupling said plate and said support shaft.

6. The machine of claim 5 wherein said coupling joint coupling said plate and said support shaft is a freewheel device.

7. The machine of claim 1 wherein said drive means moves said stand in such a manner as to operatively present each of said cups in turn to said dispenser means, said break means, said shattering means, said ejection means and said cleaner means.

8. The machine of claim 7 wherein said break means comprises two opposed hammers aligned along an axis coinciding with that of said cups presented by said stand to said break means, said hammers being situated on each side of said cups and displaceable toward each other.

9. The machine of claim 7 wherein said shattering means comprise two opposed tubular shatterers aligned along an axis coinciding with that of said cups presented by said stand to said shattering means, said shatterers being situated on each side of said cups and displaceable toward each other.

10. The machine of claim 7 wherein said ejection means comprises a stopper whose contour sealingly mates with the edge of said inlet orifice of said cups, said stopper being displaceable toward cups presented by said stand to said ejection means, said stopper further comprising an orifice for the introduction of said compressed fluid into the sealed off cups.

11. The machine of any of claims 1 or 7–10 wherein said break means, said shattering means, said ejection means and said cleaner means are independently spring-loaded tools, said machine further including control means comprising spring means for urging at least a portion of each of said tools from a retracted position to an extended position closer to said cups carried by said stand and jack means for returning said tool portions from said extended positions to said retracted positions, said jack means comprising a jack and means connecting the rod of said jack and said tool portions.

12. The machine of claim 1 wherein said shattering means injects said compressed fluid under pressure inside the shell from both ends of the shell.

13. The machine of claim 1 wherein said shattering means injects said compressed fluid under pressure inside the shell from both ends of the shell simultaneously.

14. An automatic machine for peeling hard-boiled eggs comprising
(A) a carrier frame;
(B) a plurality of hard-boiled egg receiver cups, each of said cups having an inlet orifice and a bottom defining a constricted circular opening whose diameter is slightly less than that of the largest diameter egg;
(C) a source of compressed fluid;
(D) a movable stand carrying said cups;
(E) drive means for driving said stand;
(F) a feeding station provided with dispenser means for delivering a hard-boiled egg to one of said cups presented thereto;
(G) break means for breaking the shell of the egg at each end thereof;
(H) shattering means operatively connected to said source of compressed fluid for injecting said compressed fluid under pressure inside the shell between the membrane and the white of the egg to shatter the shell; said shattering means comprising, on the one hand, a movable upper cover adapted to seal off said inlet orifice of said cup, and on the other hand, an arm periodically driven on a circumference portion of said carrier frame, a lower hammer slidingly mounted at the end of said arm, and a tubular shatterer surrounding said lower hammer and displaceable therewith;
(I) ejection means operatively connected to said source of compressed fluid for hermetically sealing off said inlet orifice of said cup and putting the interior thereof under sufficient pressure to drive the white of the egg out of its shattered shell thorugh said constricted circular opening of said cup, and
(J) a cleaning station provided with cleaner means for driving the shattered shell out of said cup.

15. The machine of claim 14 including escapement drive means periodically driving said arm on a circumference portion of said carrier frame.

16. The machine of claim 15 wherein said escapement drive means for said arm essentially comprises a drive nut with claws, a sleeve slidingly fixed to said arm and provided with a drive tooth normally meshing with said claws of said nut, and a ramp on said carrier frame travelled by said arm for disengaging said drive tooth from said claws.

17. The machine of claim 14 wherein said upper cover is articulated on said stand, said machine including an opening ramp, and a push rod riding said opening ramp and adapted to lift said upper cover.

* * * * *